Feb. 1, 1949.   F. E. SNOW   2,460,368
VENT CONSTRUCTION FOR AIRPLANE FUEL TANKS
Filed Aug. 30, 1947
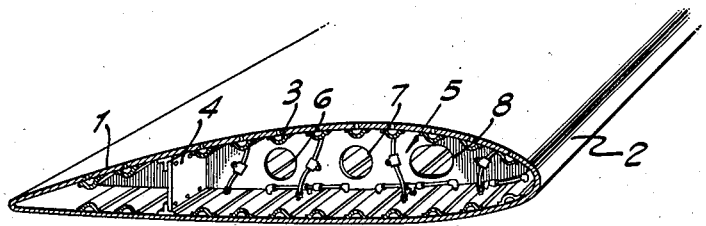
Fig. 1
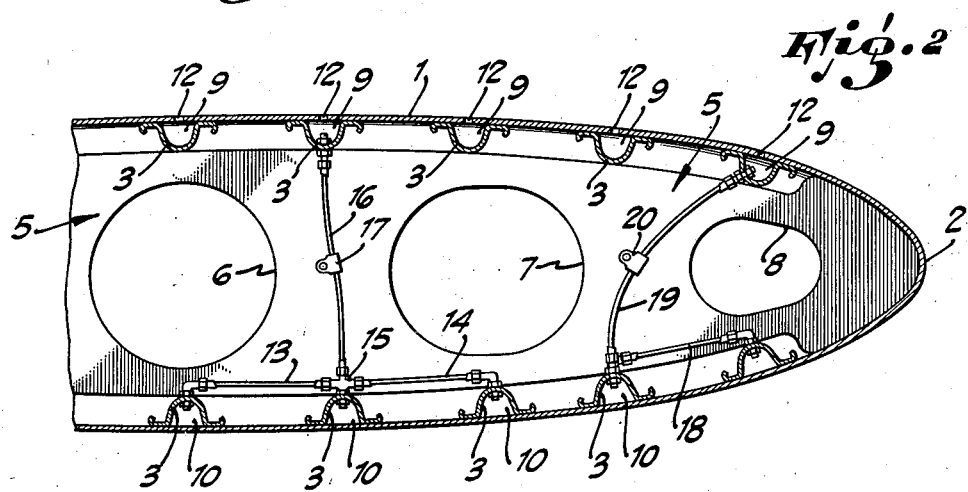
Fig. 2
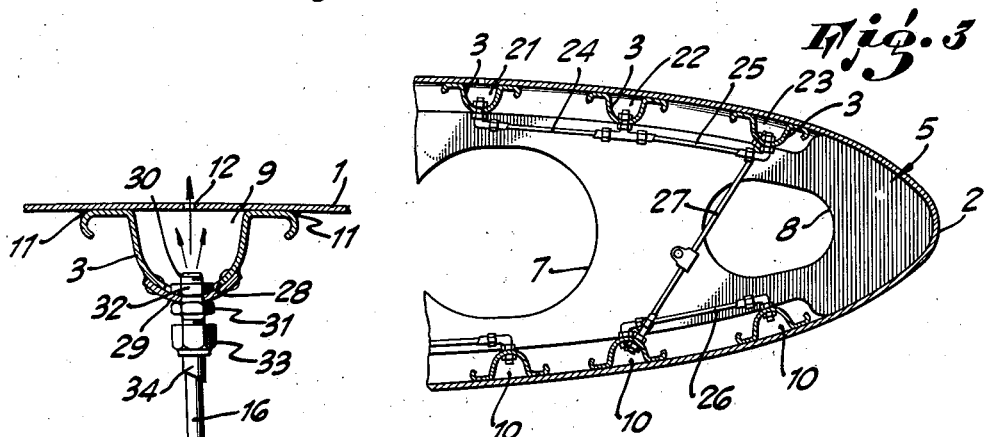
Fig. 3
Fig. 4
Floyd E. Snow,
INVENTOR.
BY John Flam
ATTORNEY.

Patented Feb. 1, 1949

2,460,368

UNITED STATES PATENT OFFICE 2,460,368

VENT CONSTRUCTION FOR AIRPLANE FUEL TANKS

Floyd E. Snow, Pasadena, Calif., assignor to Technical Coatings, Inc., Pasadena, Calif., a corporation of California Application August 30, 1947, Serial No. 771,505

3 Claims. (Cl. 220—71)

This invention relates to airplane fuel tanks and particularly to fuel tanks incorporated as parts of the wing structures.

The airfoil surfaces of airplane wings are necessarily designed to be as free of obstructions to the air stream as possible. Since the minimizing of weight is also an important factor, the rigidity of such wing structures is commonly obtained by the aid of trusses and other reinforcement members in the interior of the wings; and often, hollow channel-like "hat sections" are attached to the interior of the plates forming the wings, and running parallel to an edge of the wing structure.

When the interior of such a wing section is used as a fuel tank, and the hat section stiffeners are sealed around their ends and edges to prevent fuel from entering areas not accessible for adequate installation of sealant, minor leaks can develop around and into the hat sections. The flow and accumulation of fuel over a period may readily lead to dangerous fire hazards. Furthermore, the fuel may leak into the space defined between the interior surface of the wing and the hat sections attached thereto. In such a confined space, the vapor pressure may reach a relatively high value with consequent attendant danger of aggravating the existing leaks or establishing additional ones.

It is one of the objects of this invention to reduce these hazards by ensuring that the hat section spaces are vented; thus preventing any rise in pressure.

It is another object of this invention to provide a simple and effective construction for this purpose, that can be readily installed in a fuel tank.

This invention possesses many other advantages, and has other objects which may be made more clearly apparent from a consideration of several embodiments of the invention. For this purpose there are shown a few forms in the drawings accompanying and forming part of the present specification. The forms will now be described in detail illustrating the general principles of the invention; but it is to be understood that this detailed description is not to be taken in a limiting sense, since the scope of this invention is best defined by the appended claims.

Referring to the drawings:

Figure 1 is a sectional, pictorial view of a fuel tank incorporating the invention, some of the parts being shown diagrammatically;

Fig. 2 is a fragmentary, sectional view of the tank on an enlarged scale;

Fig. 3 is a view similar to Fig. 2, but of a modified form of the invention; and Fig. 4 is an enlarged sectional view of one of the vent fittings.

The tank for the airplane is shown as bounded by the outer wall 1 of a wing section having a leading edge 2. Although this outer wall 1 is shown as a continuous wall, it is to be understood that the usual structural elements to form the wing section may be used, joined together as by welding or riveting.

Running parallel with the leading edge 2 are a number of reinforcing channel members 3, ordinarily termed "hat sections." These are attached in any appropriate manner to the inner surface of the outer wall 1, some of them being located adjacent the top of the wing section and others at the bottom of the wing section. The tank compartment is defined by the wall 1 and the internal girder plate 4, shown in Fig. 1. Transverse trusses 5 having apertures 6, 7, 8, etc. are disposed in spaced relationship along the length of the wing structure.

All of the hat sections 3 are of similar configuration. They extend entirely along the whole length of the tank and form closed spaces, such as 9, at the top of the tank, and spaces 10 at the bottom of the tank. Appropriate sealing means, such as the putty-like seal 11 (Fig. 4) may be placed between the edges of the hat section flanges and wall 1, to reduce the likelihood of leaks from the interior of the tank to the spaces 9 and 10.

Each of the top spaces 9 is vented to the exterior of the wing section, as by the aid of the vents 12 through the wing section. In this way, should there be any leaks from the interior of the tank past any edge of the hat sections 3, the fuel collected in these closed spaces 9 would not be subject to other than atmospheric pressure. Furthermore, since the tank would not be entirely filled with liquid, the likelihood of any material amount of fuel leaking into these upper spaces is reduced.

However, fuel may leak into the lower spaces 10 in spite of all precautions to seal these spaces. If there were no vents from these spaces, vapor pressures would occur in these closed spaces that would aggravate the leak. Accordingly, provisions are made to vent each of the lower spaces 10 to the upper space 9 by the aid of vent connections that are located within the tank or wing section.

Thus, as shown most clearly in Fig. 2, a number of spaces 10 may be joined by the vent connections 13 and 14 and a cross connection 15. The cross connection 15 is in communication with a vent pipe 16 leading to an upper space 9. The pipe connection 16 may be appropriately attached to a truss 5, as by the clip 17.

Similarly, the vent pipes 18 and 19 serve to connect the two-right hand spaces 10 to the extreme right-hand upper space 9. The vent connection 19 may be attached, as by clip 20, to the truss 5.

It is required merely that all of the lower spaces 10 be connected to a vented upper space, or directly to the upper surface the arrangement of the vent pipes being otherwise immaterial.

For example, in the form of Fig. 3, the upper space 21 is vented, but other upper spaces 22 and 23 are not vented. Here, all of these three upper spaces are in communication with the atmosphere by the aid of the vent connections 24 and 25. The vent connections to the lower spaces 10 are effected by the vent connection 26, joined to the right-hand spaces 10, and by the supplemental vent connection 27 joined to this top space 23.

The manner in which the vent pipes may be connected is a matter of choice. For example, Fig. 4 shows one structure to effect such connections from the vent pipes to either a top or bottom space.

Thus, in Fig. 4, the hat section 3 is shown as having a large aperture 28 at its crest covered by a riveted arcuate plate 29. Passing through the plate 29 is a nipple 30 having an integral hexagonal section 31 intermediate the body of the nipple. A nut 32 inside space 9 serves to fasten the inner end of the nipple in a fluid-tight manner to the cover plate 29. A coupling nut 33 engages the lower end of the nipple 30. It engages a sleeve 34 through which the vent 16 passes and which is in sealed contact with the lower end of the nipple 30. Since such pipe unions are well known, it is not necessary to disclose further details thereof.

The nut 33 is tightened sufficiently to hold the upper flanged ends of the sleeve 34 and vent pipe 16 in sealed relation to the lower end of the nipple 30.

All of the vent pipes shown may be similarly joined and coupled.

The inventor claims:

1. In an airplane fuel tank; walls defining the tank structure; channel-like members secured on the interior of the walls for reinforcement and forming spaces between the walls and the members; at least some of the members being at the bottom wall; and means within the tank for venting the said spaces that are adjacent the bottom wall.

2. In an airplane fuel tank; walls defining the tank structures; channel-like members secured on the interior of the wall for reinforcement and forming spaces between the walls and the members; those spaces at the top of the tank being vented; and means within the tank connecting all of the spaces adjacent the bottom wall to vented spaces at the top of the tank.

3. In an airplane fuel tank; walls defining the tank structure; channel-like members secured on the interior of the wall for reinforcement and forming spaces between the walls and the members; those spaces at the top of the tank being vented; and means within the tank connecting all of the spaces adjacent the bottom wall to vented spaces at the top of the tank, comprising venting tube or tubes connecting the bottom spaces with top spaces.

FLOYD E. SNOW.

REFERENCES CITED

The following references are of record in the file of this patent:

UNITED STATES PATENTS

| Number | Name | Date |
|---|---|---|
| 1,651,521 | Girardville | Dec. 6, 1927 |
| 2,003,808 | Mascuch | June 4, 1935 |
| 2,157,682 | Horton et al. | Oct. 20, 1936 |
| 2,423,879 | De Frees | July 15, 1947 |